(12) United States Patent
Musah et al.

(10) Patent No.: US 10,756,931 B2
(45) Date of Patent: Aug. 25, 2020

(54) LOW POWER HIGH SPEED RECEIVER WITH REDUCED DECISION FEEDBACK EQUALIZER SAMPLERS

(71) Applicant: Intel Corporation, Santa Clara, CA (US)

(72) Inventors: Tawfiq Musah, Hillsboro, OR (US); Hariprasath Venkatram, Hillsboro, OR (US); Bryan K. Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/452,381

(22) Filed: Jun. 25, 2019

(65) Prior Publication Data

US 2019/0312756 A1  Oct. 10, 2019

Related U.S. Application Data

(63) Continuation of application No. 14/637,291, filed on Mar. 3, 2015, now Pat. No. 10,341,145.

(51) Int. Cl.
*H04L 25/03* (2006.01)
*H04L 7/033* (2006.01)
*H04L 7/00* (2006.01)

(52) U.S. Cl.
CPC ...... *H04L 25/03019* (2013.01); *H04L 7/0334* (2013.01); *H04L 25/03038* (2013.01); *H04L 25/03057* (2013.01); *H04L 25/03885* (2013.01); *H04L 7/0062* (2013.01)

(58) Field of Classification Search
CPC ......... H04L 25/03019; H04L 25/03885; H04L 25/03038; H04L 25/03057; H04L 7/0334; H04L 7/0062
See application file for complete search history.

(56) References Cited

U.S. PATENT DOCUMENTS

| 7,525,462 | B2 | 4/2009 | Parthasarthy et al. |
| 7,525,470 | B2 | 4/2009 | Parthasarthy et al. |
| 7,539,243 | B1 * | 5/2009 | Toifl .................. H04L 25/03057 327/100 |

(Continued)

FOREIGN PATENT DOCUMENTS

| CN | 103970699 | 8/2014 | |
| GB | 2521526 A * | 6/2015 | ........... H04L 7/0334 |
| WO | 2014209326 | 12/2014 | |

OTHER PUBLICATIONS

K. Mueller and M. Muller, Timing Recovery in Digital Synchronous Data Receivers, in IEEE Transactions on Communications, vol. 24, No. 5, pp. 516-531, May 1976. (Year: 1976).*

(Continued)

*Primary Examiner* — Berhanu Tadese
(74) *Attorney, Agent, or Firm* — Green, Howard & Mughal, LLP

(57) ABSTRACT

Described is an apparatus which comprises: a Variable Gain Amplifier (VGA); a set of samplers to sample data output from the VGA according to a clock signal; and a Clock Data Recovery (CDR) circuit to adjust phase of the clock signal such that magnitude of a first post-cursor signal associated with the sampled data is substantially half of a magnitude of a primary cursor tap associated with the sampled data.

21 Claims, 10 Drawing Sheets

(56) References Cited

U.S. PATENT DOCUMENTS

| | | | |
|---|---|---|---|
| 7,782,935 B1* | 8/2010 | Wong | H03H 11/26 375/229 |
| 7,830,987 B2 | 11/2010 | Bhoja et al. | |
| 7,961,781 B2* | 6/2011 | Telang | H04B 10/25133 375/229 |
| 8,300,685 B2* | 10/2012 | Chen | H04L 25/03057 360/46 |
| 8,615,062 B2 | 12/2013 | Chmelar | |
| 8,649,476 B2 | 2/2014 | Malipatil et al. | |
| 8,693,596 B1* | 4/2014 | Warner | H03G 3/00 370/395.62 |
| 8,705,672 B2* | 4/2014 | Malipatil | H04L 25/03019 375/345 |
| 8,724,688 B1* | 5/2014 | Gagnon | H04L 25/03057 375/232 |
| 8,791,735 B1* | 7/2014 | Shibasaki | H03L 7/0812 327/156 |
| 8,831,142 B2* | 9/2014 | Kotagiri | H04L 25/063 375/229 |
| 8,837,626 B2* | 9/2014 | Malipatil | H04L 25/0307 375/233 |
| 8,890,580 B2* | 11/2014 | Zerbe | H03K 5/1252 327/108 |
| 8,929,428 B2* | 1/2015 | Francese | H04L 25/03878 375/231 |
| 8,958,512 B1* | 2/2015 | Ding | H04L 25/03057 375/350 |
| 8,964,826 B2* | 2/2015 | Agrawal | H04L 27/01 375/230 |
| 8,964,925 B1* | 2/2015 | Saed | H03L 7/0807 375/294 |
| 8,976,855 B2* | 3/2015 | Xu | H04L 25/03057 375/232 |
| 9,014,313 B2 | 4/2015 | Chmelar | |
| 9,048,999 B2 | 6/2015 | He et al. | |
| 9,143,369 B2* | 9/2015 | He | H04L 25/03343 |
| 9,160,405 B1* | 10/2015 | Vareljian | H04B 3/32 |
| 9,225,560 B1* | 12/2015 | Mishra | H04L 25/03019 |
| 9,276,781 B2* | 3/2016 | Xu | H04L 25/03057 |
| 9,374,217 B1* | 6/2016 | Forey | H04L 7/0331 |
| 9,397,823 B2* | 7/2016 | Zerbe | H03K 5/1252 |
| 9,509,531 B2 | 11/2016 | Sakai et al. | |
| 9,537,682 B2* | 1/2017 | Venkatram | H04L 25/03057 |
| 9,559,877 B1* | 1/2017 | Dallaire | H04L 25/03057 |
| 9,660,842 B2* | 5/2017 | Johnson | H04L 25/03878 |
| 9,806,699 B2* | 10/2017 | Bulzacchelli | H04L 25/03057 |
| 9,832,046 B2* | 11/2017 | Hormati | H04L 25/03057 |
| 9,882,795 B1* | 1/2018 | Zhang | H04L 43/0811 |
| 9,900,121 B1* | 2/2018 | Takatori | H04L 25/03057 |
| 9,923,738 B1* | 3/2018 | Wallichs | H04L 25/03057 |
| 10,069,657 B2* | 9/2018 | Johnson | H04L 25/03878 |
| 10,341,145 B2* | 7/2019 | Musah | H04L 25/03019 |
| 10,454,723 B1* | 10/2019 | Kossel | G06F 13/16 |
| 2002/0003835 A1* | 1/2002 | Wu | H04L 12/2838 375/219 |
| 2003/0016770 A1* | 1/2003 | Trans | H04L 1/0054 375/346 |
| 2003/0219090 A1* | 11/2003 | Baba | H03L 7/0812 375/376 |
| 2006/0093028 A1* | 5/2006 | Balan | H04L 25/03343 375/233 |
| 2006/0188043 A1* | 8/2006 | Zerbe | H04W 52/20 375/346 |
| 2006/0256892 A1* | 11/2006 | Momtaz | H04L 25/061 375/317 |
| 2007/0195874 A1* | 8/2007 | Aziz | H04L 7/0062 375/233 |
| 2008/0048896 A1* | 2/2008 | Parthasarthy | H03M 1/0836 341/120 |
| 2008/0048897 A1* | 2/2008 | Parthasarthy | H03M 1/183 341/122 |
| 2008/0049825 A1* | 2/2008 | Chen | H04L 25/03057 375/233 |
| 2008/0049847 A1* | 2/2008 | Telang | H04L 25/03063 375/242 |
| 2008/0069198 A1* | 3/2008 | Bhoja | H04L 25/061 375/233 |
| 2008/0069199 A1* | 3/2008 | Chen | H04L 25/061 375/233 |
| 2008/0187036 A1* | 8/2008 | Park | H04L 25/03146 375/233 |
| 2008/0187082 A1* | 8/2008 | Bhoja | H04L 7/0062 375/371 |
| 2008/0191772 A1* | 8/2008 | Pickering | H03K 5/151 327/243 |
| 2008/0191774 A1* | 8/2008 | Lytollis | H03K 21/40 327/298 |
| 2008/0191910 A1* | 8/2008 | Simpson | H03M 7/165 341/97 |
| 2008/0192640 A1* | 8/2008 | Simpson | H04L 1/241 370/249 |
| 2008/0192859 A1* | 8/2008 | Foley | H04L 25/085 375/296 |
| 2008/0192860 A1* | 8/2008 | Harwood | H04L 25/08 375/296 |
| 2008/0195363 A1* | 8/2008 | Lytollis | G06F 30/367 703/3 |
| 2008/0205563 A1* | 8/2008 | Simpson | H03H 17/0261 375/350 |
| 2008/0212606 A1* | 9/2008 | Batty | H03M 9/00 370/464 |
| 2008/0212607 A1* | 9/2008 | Batty | G06F 13/4072 370/464 |
| 2008/0212718 A1* | 9/2008 | Lytollis | H03G 3/002 375/340 |
| 2008/0215947 A1* | 9/2008 | Hunt | G01R 31/31727 714/745 |
| 2008/0219390 A1* | 9/2008 | Simpson | H04L 7/033 375/355 |
| 2008/0304557 A1* | 12/2008 | Hollis | H04L 25/03885 375/231 |
| 2009/0052599 A1* | 2/2009 | Yanagisawa | G09G 5/008 375/354 |
| 2009/0060021 A1* | 3/2009 | Bulzacchelli | H04L 25/03057 375/233 |
| 2009/0102692 A1* | 4/2009 | Pickering | H03K 5/1515 341/155 |
| 2009/0232196 A1* | 9/2009 | Sunaga | H04L 25/4906 375/233 |
| 2010/0046683 A1* | 2/2010 | Beukema | H04L 7/0062 375/355 |
| 2010/0103998 A1* | 4/2010 | Erba | H04L 25/0307 375/233 |
| 2010/0202506 A1* | 8/2010 | Bulzacchelli | H04L 25/03057 375/233 |
| 2010/0284686 A1* | 11/2010 | Zhong | H04L 25/03019 398/1 |
| 2010/0289544 A1* | 11/2010 | Lee | H04L 7/033 327/159 |
| 2010/0303506 A1* | 12/2010 | Hara | G03G 9/1132 399/252 |
| 2011/0311008 A1* | 12/2011 | Slezak | H03M 9/00 375/353 |
| 2012/0044983 A1* | 2/2012 | Kerr | H04L 25/03057 375/233 |
| 2012/0068748 A1* | 3/2012 | Stojanovic | H04L 7/0331 327/161 |
| 2012/0166505 A1* | 6/2012 | Hogeboom | G06F 5/16 708/301 |
| 2012/0201289 A1* | 8/2012 | Abdalla | H04L 25/03057 375/233 |
| 2012/0243599 A1* | 9/2012 | Kossel | H04L 25/03343 375/233 |
| 2012/0257652 A1* | 10/2012 | Malipatil | H04L 7/0062 375/219 |
| 2013/0039407 A1* | 2/2013 | Aziz | H04L 25/14 375/233 |
| 2013/0077669 A1* | 3/2013 | Malipatil | H04L 25/03019 375/233 |

(56) References Cited

U.S. PATENT DOCUMENTS

| | | | |
|---|---|---|---|
| 2013/0148712 A1* | 6/2013 | Malipatil | H04L 25/03885 375/233 |
| 2013/0169314 A1* | 7/2013 | Choudhary | H04L 25/03057 327/91 |
| 2013/0195215 A1* | 8/2013 | Manglani | H04B 17/318 375/295 |
| 2013/0202064 A1* | 8/2013 | Chmelar | H04L 25/03057 375/340 |
| 2013/0202065 A1* | 8/2013 | Chmelar | H04L 25/03057 375/340 |
| 2014/0103976 A1* | 4/2014 | Nonis | H03L 7/091 327/158 |
| 2014/0133544 A1 | 5/2014 | Gagnon | |
| 2014/0140389 A1* | 5/2014 | Chen | H04L 25/03146 375/233 |
| 2014/0152357 A1* | 6/2014 | Zerbe | H04L 7/02 327/155 |
| 2014/0169440 A1* | 6/2014 | Kotagiri | H04L 25/063 375/233 |
| 2014/0177697 A1* | 6/2014 | Nguyen | H04L 25/03057 375/233 |
| 2014/0232464 A1* | 8/2014 | Song | H04L 25/0276 330/258 |
| 2014/0269889 A1* | 9/2014 | Xu | H04L 25/03057 375/233 |
| 2014/0307769 A1* | 10/2014 | He | H04L 25/03057 375/233 |
| 2014/0355147 A1* | 12/2014 | Cideciyan | G11B 20/1833 360/31 |
| 2015/0016496 A1* | 1/2015 | Mukherjee | H04L 25/03057 375/233 |
| 2015/0036775 A1* | 2/2015 | Zerbe | H03L 7/00 375/371 |
| 2015/0049798 A1* | 2/2015 | Hossein | H04L 25/03006 375/233 |
| 2015/0055694 A1* | 2/2015 | Juenemann | H04L 25/0276 375/233 |
| 2015/0163077 A1* | 6/2015 | Xu | H04L 25/03057 375/233 |
| 2015/0180642 A1* | 6/2015 | Hsieh | H04L 7/0062 375/233 |
| 2015/0180648 A1* | 6/2015 | Francese | H04L 7/02 375/371 |
| 2015/0188693 A1* | 7/2015 | Giaconi | H04L 7/0058 375/233 |
| 2015/0349991 A1* | 12/2015 | Iyer | H04L 7/0062 375/233 |
| 2015/0358005 A1* | 12/2015 | Chen | H03K 5/003 375/233 |
| 2015/0381393 A1* | 12/2015 | Kotagiri | H04L 25/0292 375/233 |
| 2016/0006596 A1* | 1/2016 | Dickson | H04L 27/01 375/298 |
| 2016/0080178 A1* | 3/2016 | Chen | H03L 7/091 375/233 |
| 2016/0099718 A1* | 4/2016 | Shibasaki | H03L 7/089 327/155 |
| 2016/0127155 A1* | 5/2016 | Johnson | H04L 25/03878 375/233 |
| 2016/0191276 A1* | 6/2016 | Sakai | H04L 25/03057 375/233 |
| 2016/0209462 A1* | 7/2016 | Choi | G01R 31/3171 |
| 2016/0218894 A1* | 7/2016 | Fox | H04L 25/03885 |
| 2016/0261435 A1* | 9/2016 | Musah | H04L 25/03019 |
| 2016/0277219 A1* | 9/2016 | Venkatram | H04L 7/0062 |
| 2016/0352557 A1* | 12/2016 | Liao | H04L 27/3809 |
| 2017/0005841 A1* | 1/2017 | Komori | H04L 25/03057 |
| 2017/0187552 A1* | 6/2017 | Sakai | H04B 1/16 |
| 2017/0257168 A1* | 9/2017 | Gopalakrishnan | H04L 25/00 |
| 2017/0279642 A1* | 9/2017 | Fox | H04L 5/02 |
| 2017/0295039 A1* | 10/2017 | Hidaka | H04L 25/03267 |
| 2018/0115442 A1* | 4/2018 | Tajalli | H04L 7/02 |
| 2019/0312756 A1* | 10/2019 | Musah | H04L 7/0334 |

OTHER PUBLICATIONS

Shibasaki et al., "A 56-Gb/s receiver front-end with a CTLE and 1-tap DFE in 20-nm CMOS" IEEE Symp. VLSI Circuits, Jun. 2014, pp. 91-92 (2 pages). (Year: 2014).*

Mueller et al., "Timing Recovery in Digital Synchronous Data Receivers" IEEE Transactions on Communications, vol. COM-24, No. 5, May 1976, pp. 516-531 (16 pages). (Year: 1976).*

Parhi, "Design of Multigigabit Multiplexer-Loop-Based Decision Feedback Equalizers" IEEE Transactions on Very Large Scale Integration (VLSI) Systems, vol. 13, No. 4, Apr. 2005, pp. 489-493 (5 pages). (Year: 2005).*

Final Office Action, dated Jul. 6, 2018 for U.S. Appl. No. 14/637,291.

Office Action dated Oct. 3, 2018 for Taiwan Patent Application No. 105102871.

Extended European Search Report dated Dec. 21, 2018 for EP Patent Application No. 16759234.4.

Final Office Action for U.S. Appl. No. 14/637,291, dated Apr. 20, 2017.

International Preliminary Report on Patentability for International Patent Application No. PCT/US2016/014827, dated Sep. 14, 2017.

International Search Report and Written Opinion for International Patent Application No. PCT/US2016/014827, dated Jun. 3, 2016.

Non-Final Office Action for U.S. Appl. No. 14/637,291, dated Dec. 15, 2017.

Non-Final Office Action, dated Aug. 25, 2016, for U.S. Appl. No. 14/637,291.

Notice of Allowance dated Jan. 10, 2019 for U.S. Appl. No. 14/637,291.

Office Action and Search Report for Taiwan Patent Application No. 105102871, dated Aug. 9, 2017.

Office Action and Search Report for Taiwan Patent Application No. 105102871, dated Mar. 9, 2018.

Francese et al., "A 16 Gb/s 3.7 mW/Gb/s 8-Tap DFE Receiver and Baud-Rate CDR with 31 kppm Tracking Bandwidth", IEEE Journal of Solid-State Circuits, IEEE Service Center, Piscataway, NJ, US, vol. 49, No. 11, Jan. 11, 2014, [ages 2490-2502, XP011562657.

Francese et al., "A 16 Gb/s receieve with DC wander compensated rail-to-rail AC coupling and passive linear-equalizer in 22 nm CMOS", European Solid State Circuits Conference (ESSCIRC), Sep. 2014.

Kim et al., "Equalizer Design and Performance Trade-Offs in ADC-Based Serial Links", Custom Integrated Circuits Conference, 2010 IEEE, IEEE Piscataway, NJ, US, Sep. 19, 2010, pp. 1-8, XP031786841.

Mueller "Timing Recovery in Digital Synchronous Data Receivers", IEEE Transactions on Communications, vol. COM-24, No. 5, May 1976, pp. 516-531 (16 pages).

Musah, T. et al., "A 4-32 Gb/s Bidirectional Link with 3-Tap FFE/6-Tap DFE and Collaborative CDR in 22 nm", IEEE Journal of Solid-State Circuits, IEEE Service Center, Piscataway, NJ, US vol. 49, No. 12. Dec. 1, 2014 pp. 3079-3090. XP011564892.

Parhi "Design of Multigigabit Multiplexer-Loop-Based Decision Feedback Equalizers", IEEE Transactions on Very Large Scale Integration (VLSI) Systems, vol. 12, No. 4, Apr. 2005, pp. 489-493 (5 pages).

Shibasaki et al., "A 56-Gb/s receiver front-end with a CTLE and 1-tap DFE in 20-nm CMOS", IEEE Symp. VLSI Circuits, Jun. 2014, pp. 91-92 (2 pages).

Sunaga et al., "An 18Gbs Duobinary receiver with a CDR-Assisted DFE", 2009 IEEE International Solid-State Circuits Conference—Digest of Technical Papers, Feb. 8-12, 2009, 10.1109/ISSCC.2009. 4977414.

1st Office Action dated Feb. 6, 2020 for Chinese Patent Application No. 201680008660.1, no translation available.

(56) References Cited

OTHER PUBLICATIONS

Office Action & Search Report dated Jan. 15, 2020 for Taiwan Patent Application No. 105102871, with translation.

* cited by examiner

| NLUR Vths | LUR tap loci | 1+D/2 tap loci | 1+D/2 Vths | Used Vths |
|---|---|---|---|---|
| H0/3 | +3H1/6 | +3H0/12 | 7H0/12 | 7H0/12 |
|  | +H1/6 | +H0/12 | 5H0/12 | 5H0/12 |
|  | -H1/6 | -H0/12 | 3H0/12 | 3H0/12 |
|  | -3H1/6 | -3H0/12 | H0/12 | H0/12 |
| 0 | +3H1/6 | +3H0/12 | 3H0/12 |  |
|  | +H1/6 | +H0/12 | H0/12 |  |
|  | -H1/6 | -H0/12 | -H0/12 |  |
|  | -3H1/6 | -3H0/12 | -3H0/12 |  |
| -H0/3 | +3H1/6 | +3H0/12 | -H0/12 | -H0/12 |
|  | +H1/6 | +H0/12 | -3H0/12 | -3H0/12 |
|  | -H1/6 | -H0/12 | -5H0/12 | -5H0/12 |
|  | -3H1/6 | -3H0/12 | -7H0/12 | -7H0/12 |

| NLUR Vths | LUR tap loci | 1+D/2 tap loci | H0 Vths | Used Vths |
|---|---|---|---|---|
| H0/2 | +3H1/6 | +3H0/12 | 9H0/12 | No Info |
|  | +H1/6 | +H0/12 | 7H0/12 | 7H0/12 |
|  | -H1/6 | -H0/12 | 5H0/12 | 5H0/12 |
|  | -3H1/6 | -3H0/12 | 3H0/12 | 3H0/12 |
| H0/6 | +3H1/6 | +3H0/12 | 5H0/12 |  |
|  | +H1/6 | +H0/12 | 3H0/12 |  |
|  | -H1/6 | -H0/12 | H0/12 |  |
|  | -3H1/6 | -3H0/12 | -H0/12 | -H0/12 |
| -H0/6 | +3H1/6 | +3H0/12 | H0/12 | H0/12 |
|  | +H1/6 | +H0/12 | -H0/12 |  |
|  | -H1/6 | -H0/12 | -3H0/12 |  |
|  | -3H1/6 | -3H0/12 | -5H0/12 |  |
| -H0/2 | +3H1/6 | +3H0/12 | -3H0/12 | -3H0/12 |
|  | +H1/6 | +H0/12 | -5H0/12 | -5H0/12 |
|  | -H1/6 | -H0/12 | -7H0/12 | -7H0/12 |
|  | -3H1/6 | -3H0/12 | -9H0/12 | No Info |

LOW POWER HIGH SPEED RECEIVER WITH REDUCED DECISION FEEDBACK EQUALIZER SAMPLERS

CLAIM OF PRIORITY

This Application is a Continuation of, and claims priority to, U.S. patent application Ser. No. 14/637,291, filed 3 Mar. 2015, issued as U.S. Pat. No. 10,421,145, on Jul. 2, 2019, and titled, "LOW POWER HIGH SPEED RECEIVER WITH REDUCED DECISION FEEDBACK EQUALIZER SAMPLERS", which is incorporated by reference in its entirety for all purposes.

BACKGROUND

Receiver complexity and its resultant circuit bandwidth limitation is one of the main impediments for realizing power and area-efficient high data rate input-output (IO) links. Traditional Decision Feedback Equalizers (DFEs) are not feasible for removing Inter-Symbol-Interference (ISI) at high data rates in receivers of I/O links because traditional DFEs are limited by propagation delay of a closed loop having at least a summer (or adder), sampler(s), delay unit(s), and weight multiplier(s). For ultra-high data rates of 60 Giga bits per second (Gb/s) and more, one technique to improve the data rate and channel loss tolerance of IO transceivers is a DFE with tap speculation (or look-ahead). However, the exponential power and area cost of DFE tap speculation makes it unattractive for links that target power and area efficiency.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2B illustrates a Table indicating an increase in the number of data thresholds from three to twelve and a reduction back to eight when the Clock Data Recovery (CDR) timing function constrains the first post-cursor of the PAM signal to half the cursor's magnitude, according to some embodiments of the disclosure.

FIG. 2C illustrates a Table indicating an increase in the number of error thresholds from four to sixteen and a reduction back to eight when the CDR timing function constrains the first post-cursor of the PAM signal to half the cursor's magnitude, according to some embodiments of the disclosure.

DETAILED DESCRIPTION

Figure 1:
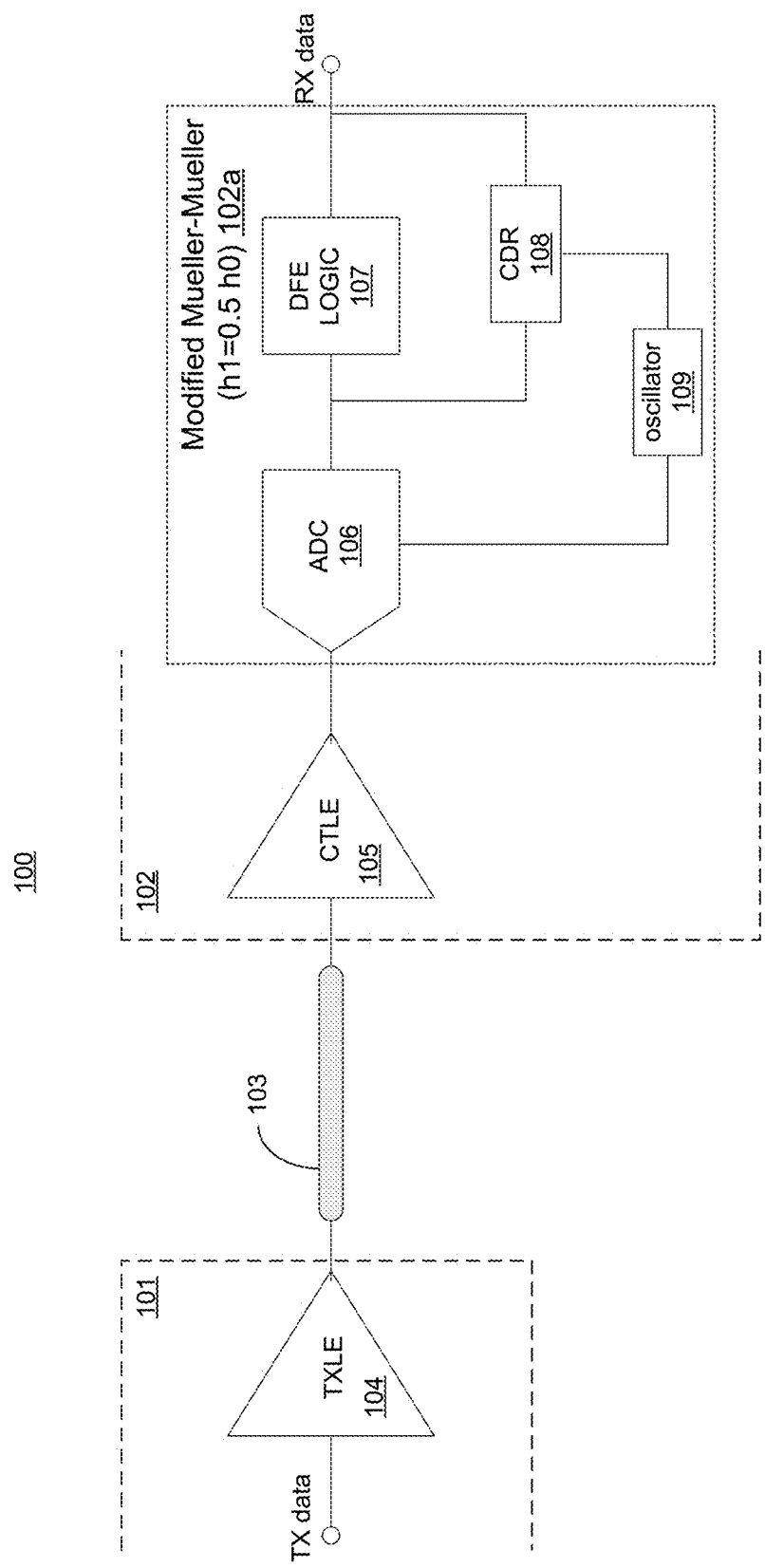
FIG. 1 illustrates a system with an apparatus having a low power high-speed receiver with reduced Decision Feedback Equalizer (DFE) samplers, according to some embodiments of the disclosure.

One way to increase the speed of Decision Feedback Equalizers (DFEs) is to use speculative DFEs. In speculative DFEs, the DFE is ready to remove Inter-Symbol-Interference (ISI) from the input data without knowing a priori whether a positive or negative weight needs to be added by weight multipliers of the DFE. As such, for removing first cursor ISI from the input data, at least two summers, two samplers, one multiplexer, and one delay unit are used.

In this example, one summer adds a positive weighting factor to the input data and another summer adds a negative weighting factor to the input data. The outputs of the summers are then sampled by the samplers (or compared by comparators). Continuing with the example of speculative DFEs, the outputs of the samplers are received by a multiplexer. A control signal selects which path of the multiplexer to select (i.e., the one with the sampled output generated from the positive weight or the one with the sampled output generated from multiplying the negative weight). The output of the multiplexer is delayed by a delay unit and then fed back to the multiplexer.

A similar architecture is used for generating the error term for clock data recovery (CDR). However, traditional speculative DFEs use another set of samplers, summers, and logic for generating the error term for CDR. For example, for a 2 Pulse Amplitude Modulation (PAM) level scheme (also referred to as 2-PAM), speculative DFE use six samplers—two for data and four for error; for a 4-PAM level scheme, speculative DFE uses 28 samplers; for an 8-PAM level scheme, speculative DFE uses 120 samplers, and so on. Using the 4-PAM level scheme as a reference example, 28 samplers and associated logic for one I/O (input-output) receiver link results in large area and power, especially when considering hundreds of links per processor.

Various embodiments described here use N-PAM signaling (where, 'N' is an integer) with modified Mueller-Muller (MMM) clock and data recovery that uses 1-tap DFE receiver architecture. In some embodiments, by using the CDR timing function to constrain the first post-cursor ISI of the PAM signals of any levels to half the cursor magnitude, the sampler thresholds of a speculative DFE overlap. This overlap leads to a significant reduction in the total number of samplers required in the DFE, according to some embodiments. In some embodiments, the DFE samplers are re-used for channel output quantization to enable multi-bit adaptation and timing recovery.

There are many technical effects of various embodiments. For example, a receiver with 4-PAM speculative DFE of the embodiments uses 28% of a conventional number of samplers in the DFE, and achieves 88 Gb/s data rate with 50 dB loss at 44 GHz. In this example, power and area reduction is achieved over traditional DFEs by eliminating 71% of DFE comparators for a 4-PAM scheme. Here, the maximum achievable data rate is also improved because vertical routing distances are cut by 71%.

In some embodiments, the same comparators are used to resolve the transmitted data and to generate the error signals for the CDR and for the Automatic Gain Control (AGC). In some embodiments, multi-bit Least Mean Square (LMS) phase detection is used to improve the CDR loop gain/bandwidth beyond what is typical for baud-rate designs. In some embodiments, no DFE tap adaptation may be needed since the CDR tracks both cursor and post-cursor taps.

Table 1 below summarizes the savings in the number of samplers for various PAM levels between a traditional speculative DFE scheme (i.e., unconstrained DFE) and the various embodiments (i.e., constrained DFE).

TABLE 1

Savings from Constrained DFE relative to Unconstrained DFE

| PAM levels | 2 | 4 | 8 | 16 | 32 | 64 |
|---|---|---|---|---|---|---|
| Unconstrained DFE | 6 | 28 | 120 | 496 | 2016 | 8128 |
| Constrained DFE | 2 | 8 | 20 | 44 | 92 | 188 |
| Savings [%] | 67 | 71 | 83 | 91 | 95 | 98 |

While various embodiments are described for enabling receivers to operate at high data rates (e.g., rates of 60 Gb/s and more), the embodiments are not limited to only high speed receivers. In some embodiments, the various mechanisms and implementations discussed are applicable to lower rate receivers (e.g., receivers operable to process data rates of 60 Gb/s and less).

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical or wireless connection between the things that are connected or an indirect electrical or wireless connection through one or more passive or active intermediary devices. The term "circuit" means one or more passive and/or active components that are arranged to cooperate with one another to provide a desired function. The term "signal" means at least one current signal, voltage signal, magnetic signal, electromagnetic signal, or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks described here are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates system 100 with an apparatus having a low power high-speed receiver with reduced DFE samplers, according to some embodiments of the disclosure. In some embodiments, system 100 comprises processor 101, processor 102, and channel 103. In some embodiments, the receiver in processor 102 includes a Modified Mueller-Mueller (MMM) timing function h1=0.5*h0, where "h1" is the first post-cursor tap and where "h0" is the primary cursor tap. While the embodiments are described with MMM timing function of h1=0.5*h0, a slight change to this timing function may still achieve the desired results in some embodiments. For example, in some embodiment, MMM timing function of h1=0.55*h0 may achieve the same result of cancelling ISI and reducing the number of comparators. In some embodiments, processor 101 comprises Transmit Linear Equalizer (TXLE) 104 that receives transmit (TX) data as input and generates data for transmission over channel 103. In some embodiments, TXLE 104 is used to pre-distort the transmitted signal in such a way that finding a sampling point where h1=0.5*h0 is easier.

In some embodiments, processor 102 comprises MMM 102a and Continuous Time Linear Equalizer (CTLE) 105. In some embodiments, CTLE 105 comprises high-frequency and low-frequency equalizers. In some embodiments, the high-frequency equalizer uses a source-degenerated Current-Mode Logic (CML) stage. In some embodiments, the low-frequency equalizer includes a feedback loop that implements a low frequency pole and zero. In other embodiments, other types of CTLEs may be used for implementing CTLE 105. For example, in some embodiments CTLEs are passive CTLEs which are implemented with passive devices. In some embodiments, CTLE 105 provides more equalization and gain that aids the DFE. For example, when few DFE taps are used, CTLE 105 is useful for canceling long tail ISI. In some embodiments, CTLE 105 is coupled to a variable gain amplifier (VGA).

In some embodiments, MMM 102a comprises analog-to-digital (ADC) converter (e.g., comparator/samplers) 106 to quantize the input data into various levels according to the threshold voltages. In some embodiments, the threshold voltages are programmable (i.e., the threshold levels can be adjusted by software or hardware). In some embodiments, ADC 106 has a multipurpose use. For example, ADC 106 is implemented as DFE samplers for both data detection (using various threshold levels as discussed with reference to FIGS. 2-3) and channel output quantization to enable multi-bit adaptation and timing recovery. In some embodiments, the function of VGA is implemented by adjusting the reference levels to ADC 106. By scaling the reference levels of ADC 106 up/down with respect to the input signal, the output of ADC 106 would appear to represent a lower/higher gain version of its input. In some embodiments, DFE samplers are clocked comparators. In other embodiments, other known samplers may be used as DFE samplers.

In some embodiments, MMM 102a comprises DFE Logic 107 (e.g., multiplexer and delay unit), CDR 108, and oscillator 109 coupled together as shown. In some embodiments, the output receiver (RX) data of DFE Logic 107 is then processed by downstream logic (not shown). In some embodiments, oscillator 109 is a digitally controlled oscillator (DCO). In other embodiments, other types of oscillators may be used for oscillator 109. For example, Inductor-Capacitor (LC) oscillator, voltage controlled oscillator (VCO), etc. may be used to implement oscillator 109. In some embodiments, oscillator 109 generates multiple phases (e.g., quadrature phases 0°, 90°, 180°, and 270°) for various sets of ADC 106. In some embodiments, oscillator 109 is used in lieu of an accumulator in the CDR loop filter (not shown here).

In some embodiments, CDR 108 has a CDR timing function (i.e., MMM timing function) which constrains the first post-cursor of PAM signal to half (or substantially half) the primary cursor's magnitude (i.e., h1=0.5*h0). In some embodiments, CDR 108 implements the above timing function by using a modified multi-bit phase detector (PD) that instructs the oscillator 109 to change the output phase of its clock signal for ADC 106 until the first post-cursor of PAM signal is substantially half (or exactly half) the primary cursor's magnitude. Here the term "half" may refer to exactly 0.50, or substantially half (or close to half) in some examples, such that when the first post-cursor of PAM signal is half the primary cursor's magnitude, the desired effect of ISI cancellation is achieved.

In some embodiments, when the above condition is satisfied, the majority of the ISI in the input data is cancelled while significantly reducing the number of samplers (thus reducing area and power) needed for data sampling and timing recovery. In some embodiments, the remaining ISI can be reduced or cancelled by using equalizers CTLE 105 at the receiver end (e.g., in processor 102) and/or TXLE 104 at the transmitter end (e.g., in processor 101).

Figure 2A:
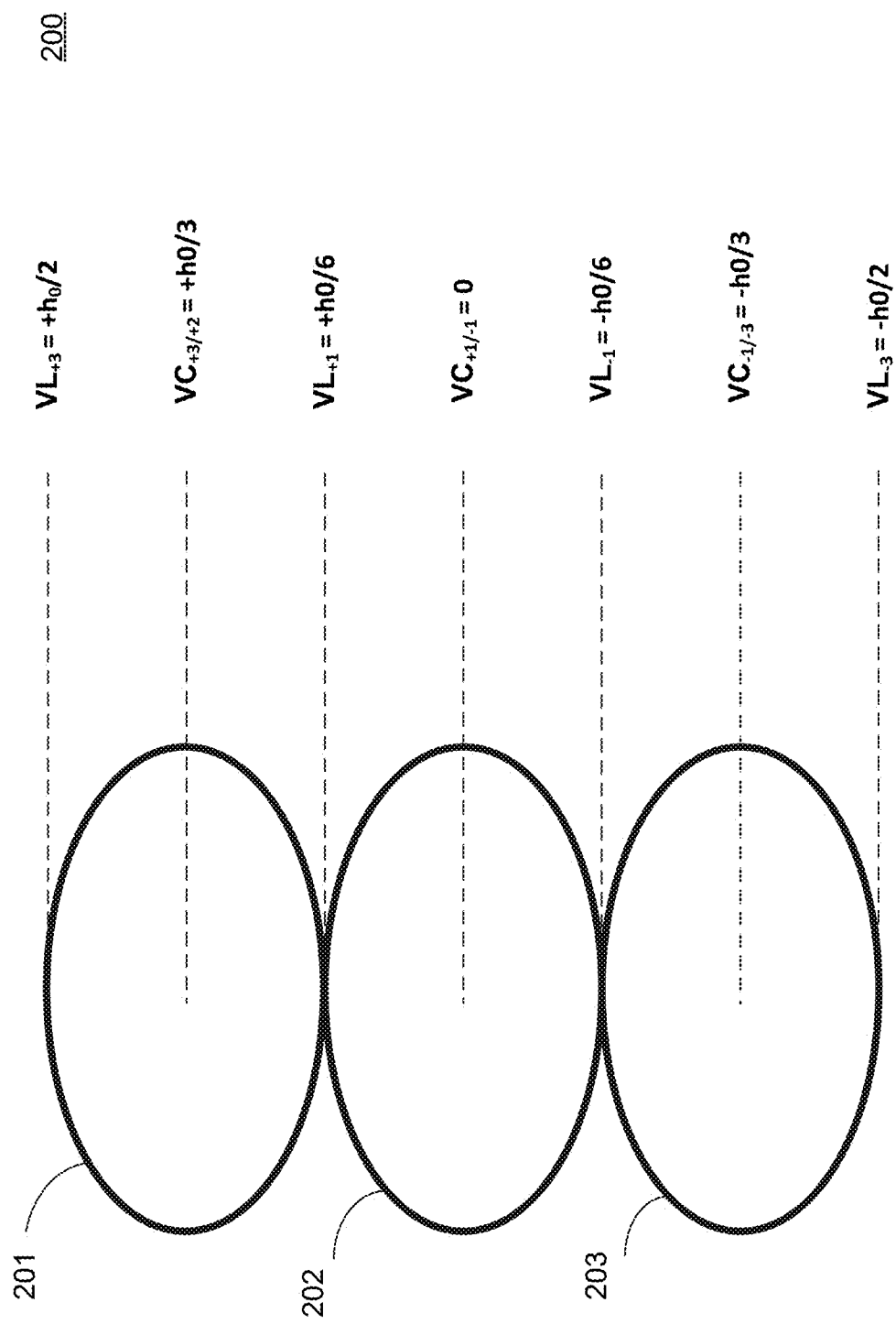
FIG. 2A illustrates three eyes sampled by three samplers to resolve 4-level Pulse Amplitude Modulation (PAM) data when no Inter-Symbol-Interference (ISI) is present.

FIG. 2A illustrates an eye diagram 200 showing the three eyes of a 4-level PAM (4-PAM) data with no ISI. It is pointed out that those elements of FIG. 2A having the same reference numbers (or names) as the elements of any other figure can operate or function in any manner similar to that described, but are not limited to such.

Here, eye diagram 200 has three eyes 201, 202, and 203 that represent the 4-PAM with no ISI, and would require seven samplers to resolve both the data and error for adaptation and clock recovery. To determine data from the three eyes, three center thresholds (i.e., $VC_{+1/-1}=0$; $VC_{+1/-3}=-h0/3$; and $VC_{+3/+2}=+h0/3$, where "VC" is the center threshold, "h0" is the primary cursor) are used. The other four level thresholds ($VL_{+3}=+h0/2$ for eye 201, $VL_{+1}=+h0/6$ for eye 201/202, $VL_{-1}=+h0/6$ for eye 201/203, and $VL_{-3}=+h0/2$ for eye 203) are used to extract the error. In the presence of first post-cursor ISI, the number of data samplers required increases from three to twelve while those required for error extraction increase from four to sixteen, bringing the total samplers needed to cancel the ISI in a speculative fashion, and to recover the clock, to twenty-eight.

In some embodiments, when the clock phase from oscillator 109 is aligned such that the first post-cursor h1 of PAM signal is constrained to half the primary cursor's magnitude (i.e., h1=0.5*h0), the first post-cursor ISI from the input data is cancelled speculatively using eight samplers, instead of twenty-eight.

FIG. 2B illustrates Table 220 indicating an increase in the number of the data thresholds (NLUR Vths) from three to twelve and the reduction back to eight (1+D/2 Vths) when the CDR timing function constrains the first post-cursor of PAM signal to half the cursor's magnitude, according to some embodiments of the disclosure. It is pointed out that those elements of FIG. 2B having the same reference numbers (or names) as the elements of any other figure can operate or function in any manner similar to that described, but are not limited to such.

The first column (labeled "NLUR Vths") of Table 220 from the left shows the original data thresholds of the PAM eyes when no ISI is present. ISI components added to each data threshold in the presence of a first post-cursor ISI of magnitude H1 (same as h1) is shown in the second column from the left (labeled "LUR tap loci"). The result of the ISI magnitude when the first post-cursor is constrained to half the magnitude of the primary cursor is shown in the third column from the left (labeled "1+D/2 tap loci"). A summation of contents of the first and third columns, which indicate the new speculative DFE sampler thresholds, is included in the fourth column (labeled "1+D/2 Vths"). The fifth column from the left list the corresponding unique elements of the fourth column.

FIG. 2C illustrates Table 230 which shows the reduction of the thresholds needed to extract the timing error needed for clock and data recovery, according to some embodiments of the disclosure. It is pointed out that those elements of FIG. 2C having the same reference numbers (or names) as the elements of any other figure can operate or function in any manner similar to that described, but are not limited to such.

The original thresholds with no ISI are included in the first column. These four thresholds grow to sixteen in the presence of a first post-cursor ISI, H1, with the ISI component listed in the second column. Once CDR 108 is used to constrain H1 to 0.5*H0, the ISI components are reduced to the values listed in the third column, according to some embodiments. Here, "H0" is the same as "h0." The thresholds used to extract the timing are the summation of the content in the first and third columns, and are included in the fourth column.

Compared to FIG. 2B, FIG. 2C has 10 unique thresholds. The highest and lowest thresholds are a result of the data not changing between two successive samples, and therefore essentially carry no phase information. As such, the middle eight thresholds are used, according to some embodiments. It is apparent that the thresholds used for data in Table 220 are the same ones used for timing error extraction in Table 240. Thus, in some embodiments, the total number of comparators required are reduced from twenty-eight to just eight.

Figure 3:
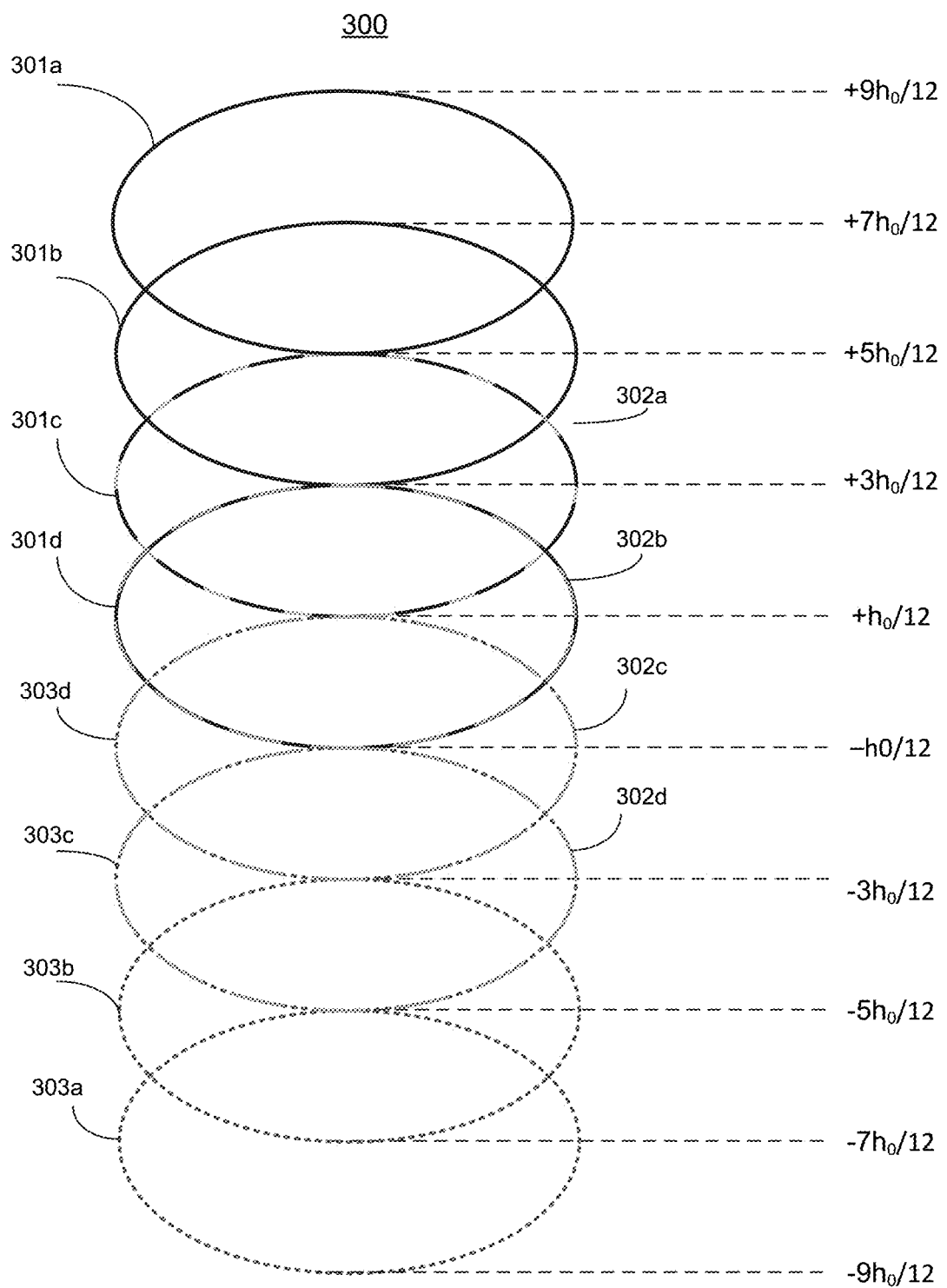
FIG. 3 illustrates overlapping eyes for generating error signal for clock recovery as well as data, according to some embodiments of the disclosure.

FIG. 3 illustrates eye diagram 300 with overlapping eyes for generating error signal for clock recovery as well as data, according to some embodiments of the disclosure. It is pointed out that those elements of FIG. 3 having the same reference numbers (or names) as the elements of any other figure can operate or function in any manner similar to that described, but are not limited to such.

Here, eye diagram 300 has twelve overlapping eyes 301a-d, 302a-d, and 303a-d that are quantized by ADC 106 for phase error determination (i.e., for timing recovery) and 1-tap speculative DFE realization. Eye diagram 300 is a graphical representation of the data and error thresholds derived in Table 220 and Table 240. Visually, the convergence of the center of an eye with the level of other eyes, brought about by the use of CDR 108 to set h1=0.5*h0, could be observed according to some embodiments.

Figure 4:
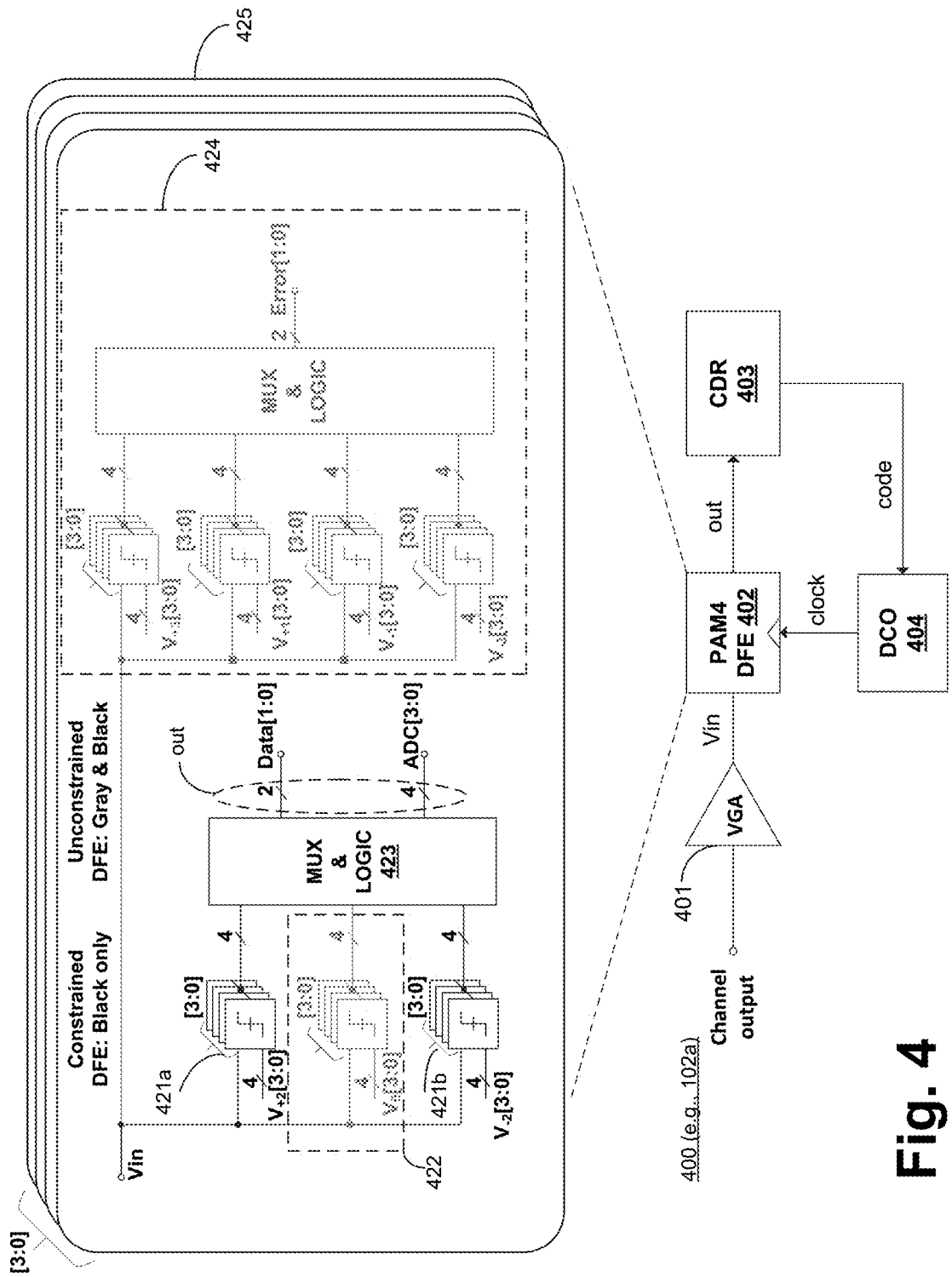
FIG. 4 illustrates an interleaved receiver slice showing reduced complexity when the CDR timing function constraining the first post-cursor of the PAM signal to half the cursor's magnitude, according to some embodiments of the disclosure.

FIG. 4 illustrates a four-way interleaved receiver 400 (e.g., part of 102a) showing reduced complexity when the CDR timing function constrains the first post-cursor of PAM signal to half the cursor's magnitude, according to some embodiments of the disclosure. It is pointed out that those elements of FIG. 4 having the same reference numbers (or names) as the elements of any other figure can operate or function in any manner similar to that described, but are not limited to such.

In some embodiments, receiver 400 comprises VGA 401, 4-PAM DFE 402 (e.g., part of ADC 106), CDR 403 (e.g., 108), and DCO 404 (e.g., oscillator 109). In some embodiments, the output of channel 103 is received by VGA 401 that amplifies the input signal and generates input data Vin. The input data Vin has ISI. In some embodiments, DFE 402 comprises samplers or clocked comparators 421a and 421b. Here, the gray and black shaded components (e.g., data sampler 422, and phase error logic 424 having four sets of samplers, where each set has four samplers coupled to a multiplexer with its associated logic) are part of a traditional unconstrained DFE while the black only shaded components (e.g., samplers 421a and 421b, and multiplexer and associated logic 423) are part of the constrained DFE of various embodiments.

In some embodiments, constraining the ISI of the DFE results in multiple data levels merging with each other, thus using fewer numbers of samplers to resolve the input data Vin. In some embodiments, an ISI constraint that forces the first post-cursor to be half of the primary cursor results in a significant number of sampler reduction regardless of PAM levels. For example, samplers 422 and those in logic 424 of traditional speculative or look-ahead DFEs are removed by the ISI constraint (h1=0.5*h0) implemented in accordance to various embodiments.

In some embodiments, the input data Vin (i.e., the output of VGA 401) is received by four slices 425 of the speculative DFE, where each slice has eight samplers (i.e., 421a [3:0] and 421b[3:0]). The four slices of 425 are labeled as [3:0]. In some embodiments, each slice 425 receives a quadrature clock from DCO 404. For example, slice 425[0] receives quadrature clock phase of 0° phase, slice 425[1] receives quadrature clock phase of 90° phase, slice 425[2] receives quadrature clock phase of 180° phase, and slice 425[3] receives quadrature clock phase of 270° phase.

In some embodiments, each sampler of set 421a receives upper threshold voltage $V_{+2}[3:0]$. For example, sampler 421a[0] receives upper threshold $V_{+2}[0]$, sampler 421a[1] receives upper threshold $V_{+2}[1]$, sampler 421a[2] receives upper threshold $V_{+2}[2]$, and sampler 421a[3] receives upper threshold $V_{+2}[3]$. In some embodiments, the output of set of samplers 421a is received by multiplexer and associated logic (MUX & LOGIC) 423 for resolving input data Vin of various eyes.

In some embodiments, each sampler of set 421b receives lower threshold voltage $V_{-2}[3:0]$. For example, sampler 421b[0] receives lower threshold $V_{-2}[0]$, sampler 421b[1] receives lower threshold $V_{-2}[1]$, sampler 421b[2] receives lower threshold $V_{-2}[2]$, and sampler 421b[3] receives lower threshold $V_{-2}[3]$.

In some embodiments, the output of set of samplers 421b is received by MUX & LOGIC 423, which together with the output of samplers 421a provides output as a flash ADC. Here, samplers 422 are removed because thresholds to samplers 421a and 421b cover all combinations for detecting data of various eyes of Vin. Removing samplers 422 saves power and area. In such embodiments, center thresholds $V_0[3:0]$ are not needed.

In some embodiments, the output "out" of MUX & LOGIC 423 includes two bits of Data[1:0] and four binary bits of ADC[3:0], where ADC[3:0] bits are used for determining the phase error. In some embodiments, ADC[3:0] bits are generated from eight bits of thermometer code. Here, the thermometer code is four bits of output from sampler set 421a when combined with four bits of the output from sampler set 421b. In some embodiments, sampler sets 421a and 421b together receive uniformly distributed thresholds $V_{+2}[3:0]$ and $V_{-2}[3:0]$ that effectively realize a flash ADC. As such, the samplers of logic 424 are not needed because the outputs of samplers 421a and 421b can be used for error calculation. Removing the samplers and logic of 424 saves power and area for the receiver.

Figure 5:
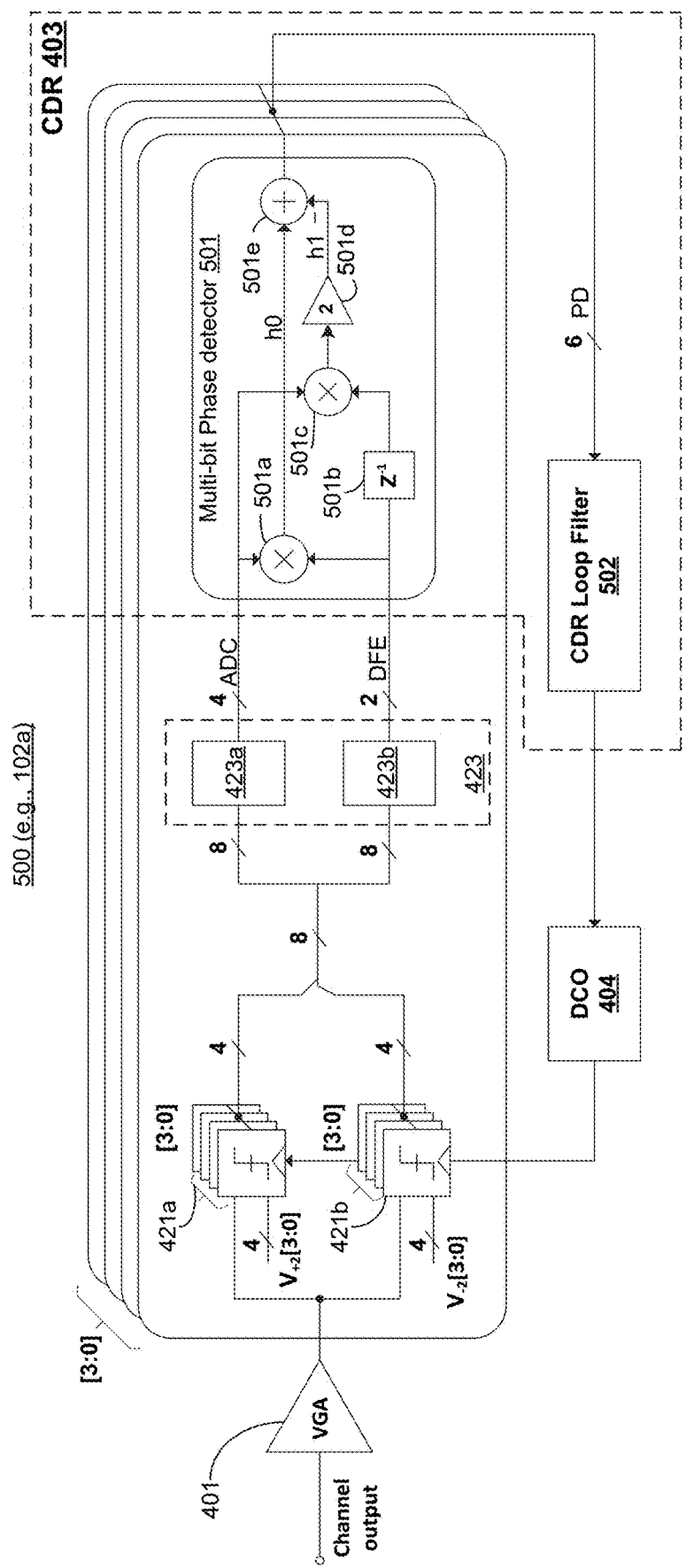
FIG. 5 illustrates an interleaved receiver slice with one speculative tap and with CDR timing function that constrains the first post-cursor of the PAM signal to half the cursor's magnitude, according to some embodiments of the disclosure.

FIG. 5 illustrates an interleaved receiver slice 500 (e.g., 102a) with one speculative tap and with CDR timing function that constrains the first post-cursor of PAM signal to half the cursor's magnitude, according to some embodiments of the disclosure. It is pointed out that those elements of FIG. 5 having the same reference numbers (or names) as the elements of any other figure can operate or function in any manner similar to that described, but are not limited to such. So as not to obscure the various embodiments, components described before are not discussed in detail again.

In some embodiments, the outputs of sets of samplers 421a and 421b are merged to form an 8-bit bus which is received by MUX & LOGIC 423. In some embodiments, MUX & LOGIC 423 comprises thermometer-to-digital converter 423a to convert the 8-bit thermometer code (i.e., the output of the flash ADC formed by the combination of sets of samplers 421a and 421b) to a 4-bit binary output ADC. In some embodiments, the 4-bit output ADC is received by a multi-bit PD 501.

In some embodiments, MUX & LOGIC 423 comprises logic 423b which includes the one or more multiplexers with a delay unit coupled to it in a feedback configuration. For example, the eight bits from samplers 421a and 421b are received by the one or more multiplexers of 423b. In some embodiments, the output of the one or more multiplexers of 423b are received by one or more delay units ($Z^{-1}$) which generate a 2-bit output DFE. In some embodiments, the output of the one or more delay units is fed back to the one or more multiplexers to select the appropriate input to the multiplexer. One example of the one or more multiplexers 423b is shown with reference to FIG. 7.

Referring back to FIG. 5, in some embodiments, CDR 403 comprises a multi-bit PD 501 and CDR Loop Filter 502. In some embodiments, PD 501 comprises correlation or expectation units 501a and 501c, delay unit ($Z^{-1}$) 501b, multiplying buffer 501d, and summer 501e. In some embodiments, the ADC output is received by correlation or expectation units 501a and 501c. Any suitable correlation or expectation unit may be used to implement correlation or expectation units 501a and 501c.

In some embodiments, the DFE output is received by correlation or expectation unit 501a and delay unit ($Z^{-1}$) 501b. In some embodiments, the output of correlation or expectation unit 501a is h0 which is received by summer 501e. In some embodiments, the output of correlation or expectation unit 501c is received by digital multiplier 501d (that multiplies the input by two). In some embodiments, the output of 501e signal PD indicates whether DCO 404 should move the phase of the clock forward or backwards from its previous position.

In some embodiments, the multi-bit PD signal also indicates the amount by which the phase of the clock should move forward or backwards from its previous position. In some embodiments, the output of signal PD (here shown as a 6-bit signal) is filtered by CDR Loop Filter 502. CDR Loop Filter 502 can be implemented with any suitable loop filter designs. The output of CDR Loop Filter 502 is then received by DCO 404 which generates the quadrature clock for the set of samplers 421a and 421b. In some embodiments, PD 501 continues to cause DCO 404 to adjust its output clock phase till the CDR timing condition h1=0.5*h0 is met. In some embodiments, when this condition is met, DCO 404 stops adjusting the clock phases. When the CDR timing condition h1=0.5*h0 is met, the majority of the ISI is cancelled from the signal DFE (output of 423b).

Figure 6:
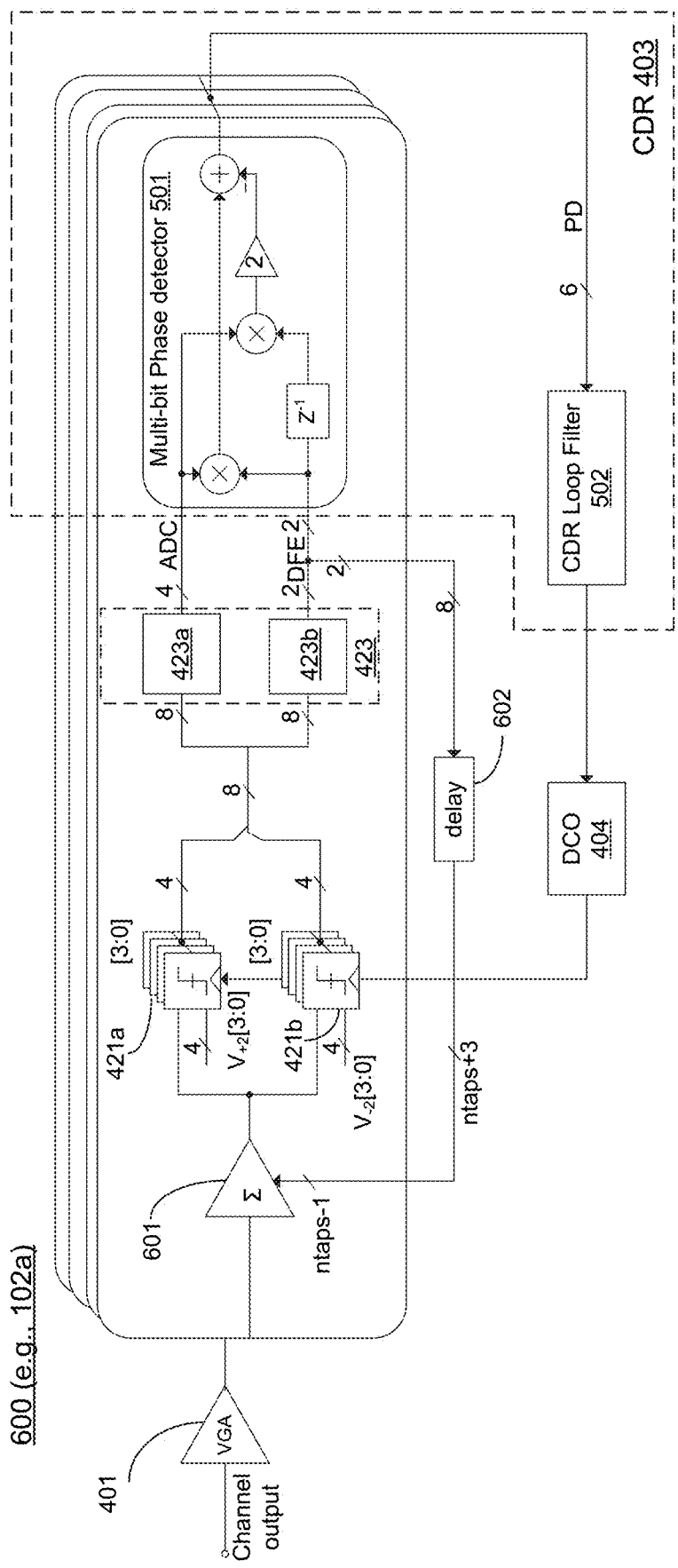
FIG. 6 illustrates an interleaved receiver slice with 'n' number of taps, only the first tap being speculative, and with CDR timing function that constrains the first post-cursor of PAM signal to half the cursor's magnitude, according to some embodiments of the disclosure.

FIG. 6 illustrates an interleaved receiver slice 600 with 'n' number of taps, the first tap being speculative, and with CDR timing function that constrains the first post-cursor of PAM signal to half the cursor's magnitude, according to some embodiments of the disclosure. It is pointed out that those elements of FIG. 6 having the same reference numbers (or names) as the elements of any other figure can operate or function in any manner similar to that described, but are not limited to such. So as not to obscure the various embodiments, components described before are not discussed in detail again.

FIG. 6 is substantially similar to FIG. 5 except that 'n' number of taps are implemented, where 'n' is an integer greater than 1. In some embodiments, DFE signals (i.e., two bits from each slice resulting in a total of eight bits) from MUX & LOGIC 423 of each of the four slices (for the 4-PAM architecture) are delayed by delay unit 602 and then summed at summer 601. In some embodiments, each receiver slice has a summer 601 which receives the output of delay 602 (i.e., ntaps-1). In some embodiments, each receiver slice summer receives an ntap-1 signal from the output of delay 602, with the feedback signals offset by one sample per receiver slice. For instance, slice[0] receives feedback signals 2:ntap, slice[1] receives 3:ntap+1, slice[2] receives 4:ntap+2, and slice[3] receives 5:ntap+3. In some embodiments, the output of VGA 401 drives the inputs of summers 601 in each receiver slice.

Figure 7:
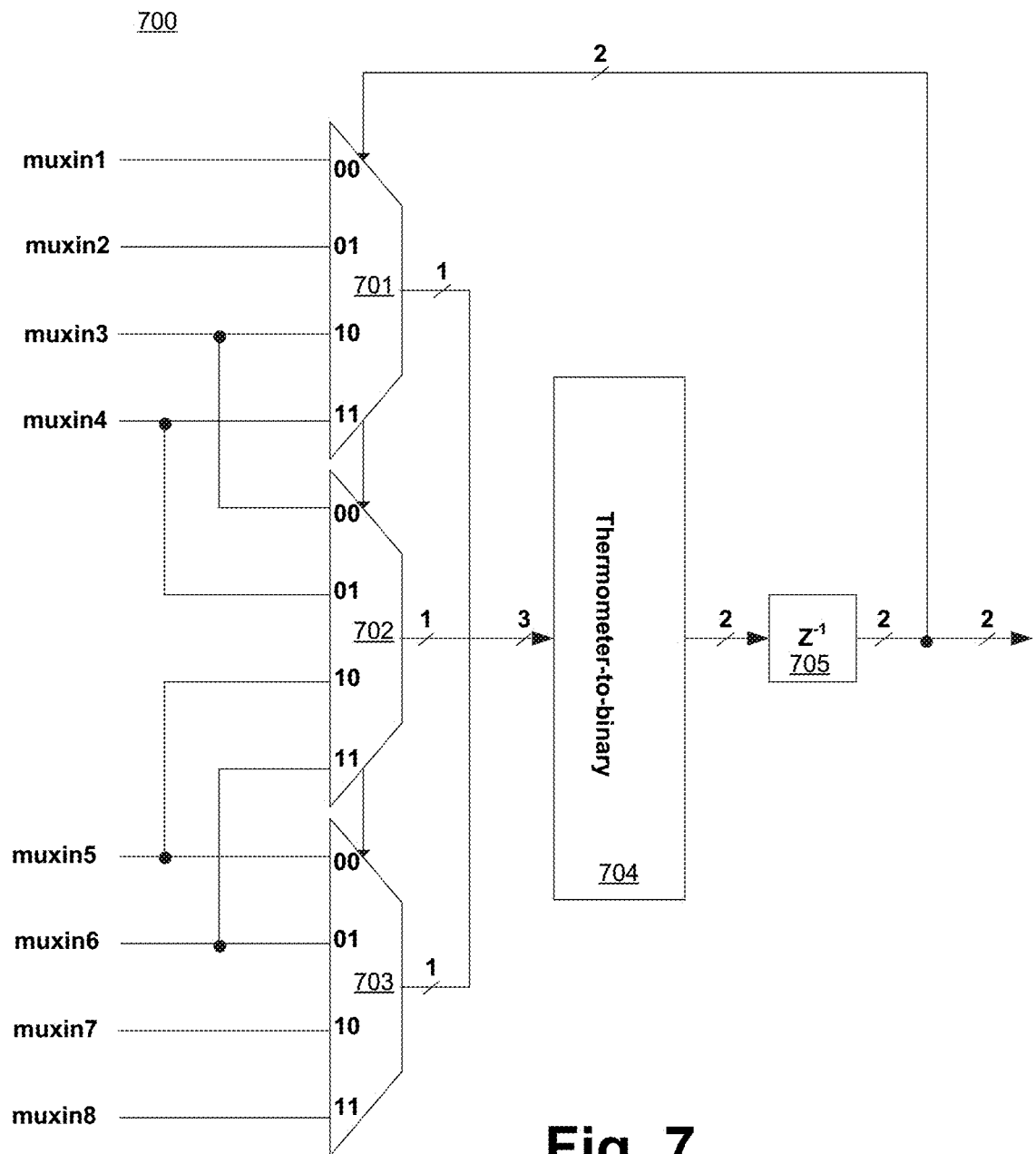
FIG. 7 illustrates a circuit having a plurality of multiplexers with feedback, according to some embodiments of the disclosure.

FIG. 7 illustrates a circuit 700 (e.g., 423b) having a plurality of multiplexers with feedback, according to some embodiments of the disclosure. It is pointed out that those elements of FIG. 7 having the same reference numbers (or names) as the elements of any other figure can operate or function in any manner similar to that described, but are not limited to such.

In this example, three multiplexers 701, 702, and 703 receive the eight bits from samplers 421a and 421b. In some embodiments, the output of multiplexers of 701, 702, and 703 are concatenated to form a 3-bit bus. In some embodiments, the 3-bit bus forms a thermometer code which is converted to a binary code by Thermometer-to-Binary converter 704. In some embodiments, the 2-bit output of converter 704 is received by delay unit 705 ($Z^{-1}$) which generates a 2-bit output DFE. In some embodiments, the output of delay unit 705 is fed back to the one or more multiplexers to select the appropriate input to for multiplexers.

Figure 8:
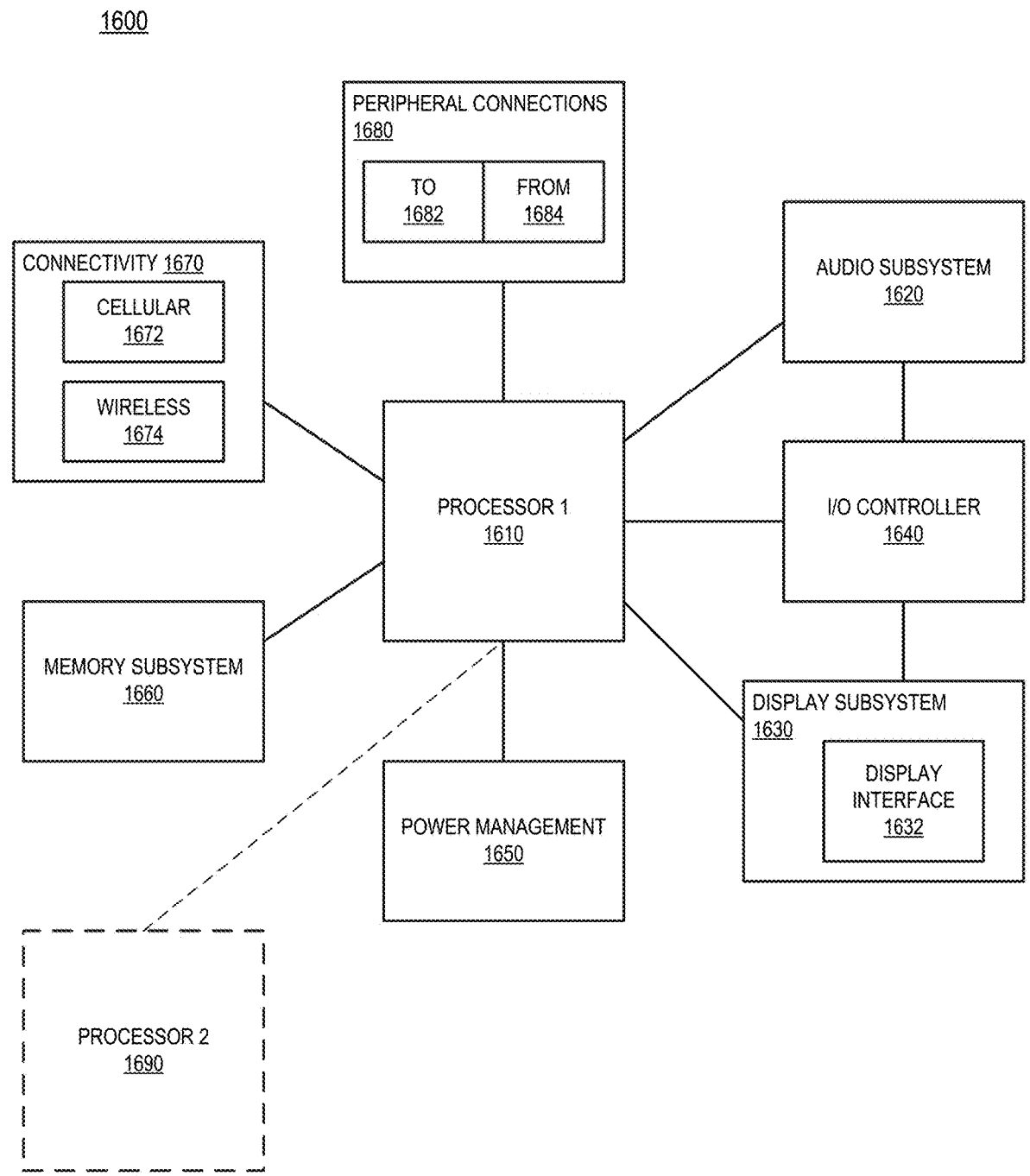
FIG. 8 illustrates a smart device or a computer system or a SoC (System-on-Chip) with apparatus having a low power high-speed receiver with reduced DFE samplers, according to some embodiments.

FIG. 8 illustrates a smart device or a computer system or a SoC (System-on-Chip) with apparatus having low power high-speed receiver with reduced DFE samplers, according to some embodiments. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with apparatus having low power high-speed receiver with reduced DFE samplers, according to some embodiments discussed. Other blocks of the computing device 1600 may also include an apparatus having low power high-speed receiver with reduced DFE samplers according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), Display-Port including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a Variable Gain Amplifier (VGA); a set of samplers to sample data output from the VGA according to a clock signal; and a Clock Data Recovery (CDR) circuit to adjust phase of the clock signal such that magnitude of a first post-cursor signal associated with the sampled data is substantially half of a magnitude of a primary cursor tap associated with the sampled data. In some embodiments, the set of samplers perform a dual operation of sampling the data output and for generating an error signal for the CDR.

In some embodiments, the apparatus comprises a Continuous Time Linear Equalizer (CTLE) coupled to an input of the VGA. In some embodiments, the set of samplers to provide quantized data for a phase detector of the CDR. In some embodiments, a thermometer-to-binary converter to convert the quantized data from a thermometer code to a binary code. In some embodiments, the apparatus comprises: a multiplexer for receiving the sampled data adjusted by a first weight and for receiving the sampled data adjusted by a second weight; and a delay unit to receive output of multiplexer and generate a delayed output for the CDR.

In some embodiments, the first and second weights have substantially equal magnitudes but different signs. In some embodiments, the CDR comprises a phase detector to receive the binary code and the delayed output from the delay unit, and to generate an output indicating adjustment to the phase for the clock signal. In some embodiments, the phase detector is a multi-bit phase detector, and wherein the output of the phase detector indicates direction and amount of phase adjustment for the clock signal.

In some embodiments, the CDR comprises a loop filter coupled to the output of the phase detector. In some embodiments, the CDR comprises a digital controlled oscillator (DCO) to receive output of the loop filter and to provide the clock signal to the set of samplers. In some embodiments, the set of samples have programmable threshold. In some embodiments, the apparatus comprises a Transmit Linear Equalizer (TXLE) provides data for the VGA.

In another example, a system is provided which comprises: a memory; a processor coupled to the memory, the processor having a receiver which includes an apparatus according to the apparatus described above; and a wireless interface for allowing the processor to communicate with another device.

In another example, a method is provided which comprises: sampling, by a set of samplers, data output from a VGA according to a clock signal; and adjusting, by a Clock Data Recovery (CDR) circuit, phase of the clock signal such that magnitude of a first post-cursor signal associated with the sampled data is substantially half of a magnitude of a primary cursor tap associated with the sampled data. In some embodiments, the method comprises performing, by the set of samplers, a dual operation of sampling the data output and for generating an error signal for the CDR.

In some embodiments, the method comprises providing quantized data for a phase detector of the CDR. In some embodiments, the method comprises converting the quantized data from a thermometer code to a binary code. In some embodiments, the method comprises: receiving, by a multiplexer, the sampled data adjusted by a first weight; receiving, by the multiplexer, the sampled data adjusted by a second weight; receiving, by a delay unit, output of the multiplexer; and generating a delayed output for the CDR.

In some embodiments, the first and second weights have substantially equal magnitudes but different signs. In some embodiments, the method comprises: receiving the binary code and the delayed output from the delay unit; and generating an output indicating adjustment to the phase for the clock signal. In some embodiments, the method comprises: receiving output of a loop filter; and generating the clock signal using the output of the loop filter.

In another example, an apparatus is provided which comprises: means for sampling data output from a VGA according to a clock signal; and means for adjusting phase of the clock signal such that magnitude of a first post-cursor signal associated with the sampled data is substantially half of a magnitude of a primary cursor tap associated with the sampled data. In some embodiments, the means for sampling data comprises means for performing a dual operation of sampling the data output and for generating an error signal.

In some embodiments, the apparatus comprises means for providing quantized data for a phase detector. In some embodiments, the apparatus comprises means for converting the quantized data from a thermometer code to a binary code. In some embodiments, the apparatus comprises: means for receiving the sampled data adjusted by a first weight; and means for receiving the sampled data adjusted by a second weight.

In some embodiments, the first and second weights have substantially equal magnitudes but different signs. In some embodiments, the apparatus comprises: means for receiving output of a loop filter; and means for generating the clock signal using the output of the loop filter.

In another example, a system is provided which comprises: a memory; a processor coupled to the memory, the processor having a receiving which includes an apparatus according to the apparatus described above; and a wireless interface for allowing the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a Continuous Time Linear Equalizer (CTLE);
a 4 Pulse Amplitude Modulation (4-PAM) based decision feedback equalizer (DFE) circuitry coupled to the CTLE, wherein an input of the 4-PAM based DFE circuitry has a response of h0+j*h0, where h0 is a primary cursor tap, and j*h0 is a first post-cursor tap, where 'j' is in a range of 0.45 and 0.55; and
a clock source that generates quadrature clock phases which are used by the 4-PAM based DFE to achieve the input response of h0+j*h0, wherein the DFE is a 1-tap DFE.

2. The apparatus of claim 1, wherein the CTLE comprises an analog front end (AFE).

3. The apparatus of claim 1, wherein the 4-PAM based DFE circuitry comprises samplers that are shared with timing recovery and DFE sampling.

4. The apparatus of claim 1 comprises a variable gain amplifier coupled to the CTLE.

5. The apparatus of claim 1, wherein the 4-PAM based DFE circuitry comprises samplers with corresponding thresholds, wherein the corresponding thresholds are adjustable.

6. The apparatus of claim 1, wherein the 4-PAM based DFE circuitry applies speculative decision feedback equalization.

7. The apparatus of claim 1, wherein the 4-PAM based DFE circuitry comprises samplers that have dual role.

8. The apparatus of claim 7, wherein the samplers comprise clocked comparators.

9. The apparatus of claim 1, wherein the 4-PAM based DFE circuitry comprises 8 comparators.

10. The apparatus of claim 1, wherein the CTLE comprises source degenerated stage.

11. The apparatus of claim 1, wherein the 4-PAM based DFE comprises an analog-to-digital converter (ADC) coupled to an output of the CTLE.

12. An apparatus comprising:
a Continuous Time Linear Equalizer (CTLE); and
a 4 Pulse Amplitude Modulation (4-PAM) based decision feedback equalizer (DFE) circuitry coupled to the CTLE, wherein the 4-PAM based DFE circuitry comprises at most 8 samplers with adjustable thresholds,
wherein an input of the 4-PAM based DFE circuitry has a response of h0+j*h0, where h0 is a primary cursor tap, and j*h0 is a first post-cursor tap, where 'j' is in a range of 0.45 and 0.55.

13. The apparatus of claim 12, comprises a clock source that generates quadrature clock phases which are used by the 4-PAM based DFE to achieve the input response of h0+j*h0, wherein the DFE is a 1-tap DFE.

14. The apparatus of claim 12, wherein the CTLE comprises an analog front end (AFE).

15. The apparatus of claim 12, wherein the samplers are shared with timing recovery and DFE sampling.

16. The apparatus of claim 12 comprises a clock source that generates quadrature clock phases, which are used by the 4-PAM based DFE circuitry.

17. The apparatus of claim 12, wherein the samplers comprise clocked comparators.

18. A system comprising:
a memory; and
a processor coupled to the memory, wherein the processor comprises a receiver which includes:
a Continuous Time Linear Equalizer (CTLE);
a 4 Pulse Amplitude Modulation (4-PAM) based decision feedback equalizer (DFE) circuitry coupled to the CTLE, wherein an input of the 4-PAM based DFE circuitry has a response of h0+j*h0, where h0 is a primary cursor tap, and j*h0 is a first post-cursor tap; and
a clock source that generates quadrature clock phases which are used by the 4-PAM based DFE to achieve the input response of h0+j*h0, wherein the DFE is a 1-tap DFE.

19. The system of claim 18, wherein the 4-PAM based DFE circuitry comprises samplers that have dual role.

20. The system of claim 19, wherein the samplers comprise clocked comparators.

21. The system of claim 18, wherein the 4-PAM based DFE circuitry comprises 8 comparators.

* * * * *